(12) United States Patent
Shinao et al.

(10) Patent No.: US 10,955,039 B2
(45) Date of Patent: Mar. 23, 2021

(54) TRANSMISSION AND ACTUATOR

(71) Applicant: Nidec Corporation, Kyoto (JP)

(72) Inventors: Takunori Shinao, Kyoto (JP); Wataru Yamauchi, Kyoto (JP); Akihiro Toda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 280 days.

(21) Appl. No.: 16/122,913

(22) Filed: Sep. 6, 2018

(65) Prior Publication Data

US 2019/0085963 A1 Mar. 21, 2019

Related U.S. Application Data

(60) Provisional application No. 62/559,026, filed on Sep. 15, 2017.

(30) Foreign Application Priority Data

May 29, 2018 (JP) .............................. JP2018-102495

(51) Int. Cl.
*F16H 49/00* (2006.01)
*F16H 57/02* (2012.01)

(52) U.S. Cl.
CPC . *F16H 49/001* (2013.01); *F16H 2057/02073* (2013.01)

(58) Field of Classification Search
CPC .................................. F16H 49/001; F16D 3/04
See application file for complete search history.

(56) References Cited

U.S. PATENT DOCUMENTS

| 2,929,266 A * | 3/1960 | Walton | F16H 49/001 |
| | | | 74/640 |
| 2016/0047451 A1* | 2/2016 | Hoshina | F16C 33/4605 |
| | | | 74/640 |
| 2019/0085906 A1* | 3/2019 | Toda | H02K 7/083 |

(Continued)

FOREIGN PATENT DOCUMENTS

JP 2005-308131 A 11/2005

*Primary Examiner* — Terence Boes
(74) *Attorney, Agent, or Firm* — Keating & Bennett

(57) ABSTRACT

A transmission includes a first shaft that is rotatable in a circumferential direction about a central axis extending in one direction, a second shaft that is rotatable in the circumferential direction and in series with the first shaft in an axial direction in which the central axis extends, a tubular housing, an internal gear including an internal tooth portion, and held by an inner surface of the housing, an annular external gear connected to the second shaft, and including an external tooth portion that partially meshes with the internal tooth portion, and a wave generator connected to the first shaft to deform the external gear such that meshing positions between the internal tooth portion and the external tooth portion shift in the circumferential direction. The internal gear and the housing are defined by separate members. At least one of a joining surface of the internal gear joined to the housing, and a joining surface of the housing joined to the internal gear, includes a recessed portion recessed in radial directions centered on the central axis. At least a portion of the recessed portion overlaps with the internal tooth portion when viewed in the radial directions.

20 Claims, 13 Drawing Sheets

(56) References Cited

U.S. PATENT DOCUMENTS

2019/0085964 A1* 3/2019 Yamauchi ............. F16H 49/001
2019/0085965 A1* 3/2019 Yamauchi ............. F16H 49/001
2019/0089224 A1* 3/2019 Hatani ................. F16H 57/025

* cited by examiner

TRANSMISSION AND ACTUATOR

CROSS REFERENCE TO RELATED APPLICATIONS

This application claims the benefit of priority to U.S. Patent Application No. 62/559,026 filed on Sep. 15, 2017 and Japanese Patent Application No. 2018-102495 filed on May 29, 2018. The entire contents of these applications are hereby incorporated herein by reference.

BACKGROUND OF THE INVENTION

1. Field of the Invention

The present invention relates to a transmission and an actuator.

2. Description of the Related Art

JP-A 2005-308131 describes a cup-shaped strain wave gearing device including a rigid internal gear, a cup-shaped flexible external gear arranged coaxially inside of the rigid internal gear, and a wave generator having an elliptical contour and fitted inside of the flexible external gear.

In the cup-shaped strain wave gearing device described in JP-A 2005-308131, the rigid internal gear serves as a housing to house components of the device. The internal gear is required to have a high wear resistance, while the housing is required to have a high workability. Wear resistance and workability stand in a trade-off relationship. Therefore, when the internal gear and the housing are defined by a single monolithic member, it is difficult to realize a high level of wear resistance and a high level of workability at the same time.

SUMMARY OF THE INVENTION

A transmission according to a preferred embodiment of the present invention includes a first shaft that is rotatable in a circumferential direction about a central axis extending in one direction; a second shaft that is rotatable in the circumferential direction, and arranged in series with the first shaft in an axial direction in which the central axis extends; a tubular housing; an internal gear including an internal tooth portion, and held by an inner surface of the housing; an annular external gear connected to the second shaft, and including an external tooth portion that partially meshes with the internal tooth portion; and a wave generator connected to the first shaft to deform the external gear such that meshing positions between the internal tooth portion and the external tooth portion shift in the circumferential direction. The internal gear and the housing are defined by separate members. The internal gear includes a joining surface joined to the housing, and the housing includes a joining surface joined to the internal gear. At least one of the joining surfaces includes at least one recessed portion recessed in radial directions centered on the central axis. At least a portion of the at least one recessed portion overlaps with the internal tooth portion when viewed in the radial directions.

An actuator according to a preferred embodiment of the present invention includes the transmission according to the above-described preferred embodiment and a rotary electric machine connected to one of the first shaft and the second shaft.

Preferred embodiments of the present invention are able to reduce the likelihood of a deterioration in meshing between the internal gear and the external gear due to transfer of the shape of the inner surface of the housing to the internal gear, and allow the internal gear to have a high wear resistance and the housing to have a high workability with a low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings.

1. First Preferred Embodiment

1-1. Overall Structure of Actuator

Figure 1:
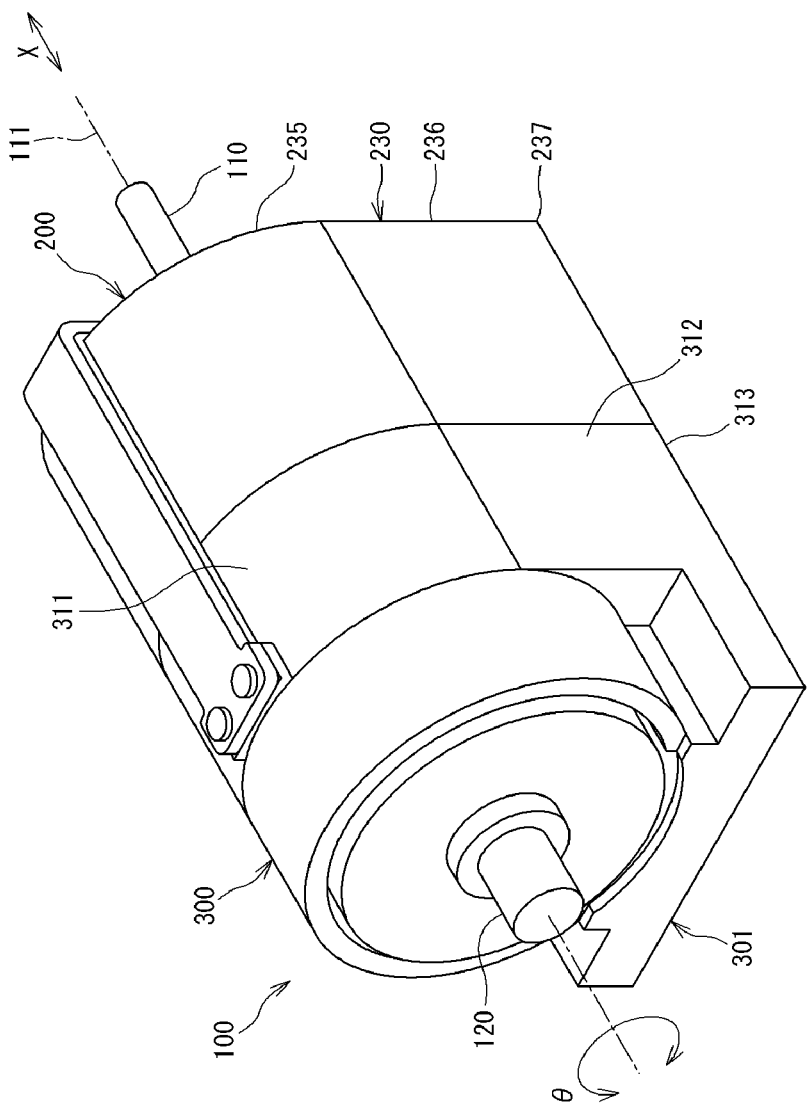
FIG. 1 is a perspective view illustrating an external structure of an actuator according to a first preferred embodiment of the present invention.
Figure 2:
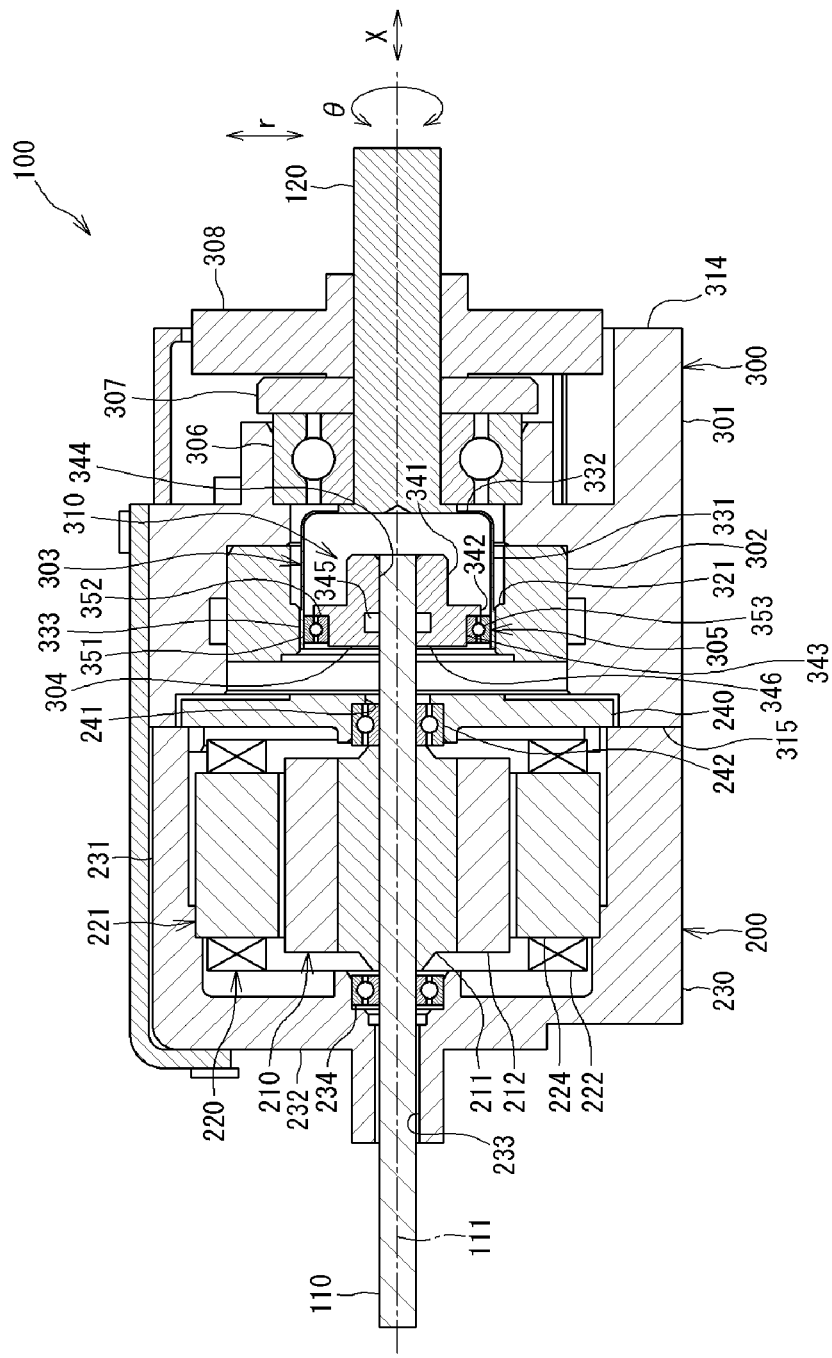
FIG. 2 is a side sectional view of the actuator according to the first preferred embodiment of the present invention.

FIG. 1 is a perspective view illustrating the external structure of an actuator 100 according to a first preferred embodiment of the present invention. FIG. 2 is a side sectional view of the actuator 100 according to the first preferred embodiment. Referring to FIGS. 1 and 2, the actuator 100 includes a motor (i.e., a rotary electric machine) 200 and a speed reducer (i.e., a transmission) 300. Note that the rotary electric machine may not necessarily be a motor, but may alternatively be an electric generator or a motor generator, which is able to function as both a motor and an electric generator. Also note that the transmission may not necessarily be a speed reducer, but may alternatively be a speed increaser.

1-2. Structure of Motor

The structure of the motor 200 will now be described below with reference to FIG. 2. The motor 200 is arranged to rotate a first shaft 110, which is a rotating shaft. The motor 200 includes a rotor 210 fixed to the first shaft 110, and a stator 220 arranged in the shape of a circular ring around the rotor 210. In this preferred embodiment, the rotor 210 is a field component, while the stator 220 is an armature. Note that the rotor 210 and the stator 220 may alternatively be an armature and a field component, respectively. It is assumed in the following description that an axial direction in which a central axis 111 of the first shaft 110 extends is an "x direction", that a circumferential direction about the central axis 111 is a "θ direction", and that radial directions centered on the central axis 111 are each an "r direction".

The rotor 210 includes a cylindrical yoke 211, and a permanent magnet 212 fixed to an outer circumferential surface of the yoke 211. A portion of the first shaft 110 extending in the x direction is housed in the yoke 211, and the yoke 211 is fixed to the first shaft 110. The permanent magnet 212 is arranged on an outer circumference of the yoke 211. The permanent magnet 212 is a ring magnet including south and north poles arranged to alternate with each other in the θ direction, and arranged at regular intervals in the θ direction. Each magnetic pole of the permanent magnet 212 is arranged on a surface facing outward in an r direction, i.e., on a surface facing the stator 220.

The stator 220 includes a core 221 and a plurality of coils 222. The core 221 is made of a soft magnetic material, and includes a plurality of teeth 224. The teeth 224 are arranged at regular intervals in the θ direction. Each tooth 224 is arranged to extend in an r direction toward the central axis 111. The number of coils 222 and the number of teeth 224 are equal to each other.

The number of coils 222, that is, the number of slots, is different from the number of poles of the permanent magnet 212. In the case of a three-phase motor, for example, the number of slots is a multiple of three, and the number of poles is an even number.

The motor 200 further includes a casing 230 and a cover 240. The casing 230 includes a tubular portion 231 and a plate-shaped cover portion 232. The tubular portion 231 has a columnar space defined inside thereof, and one end of the tubular portion 231, i.e., an end portion of the tubular portion 231 in the x direction in the example of FIG. 2, is closed by the cover portion 232. The casing 230 as described above is arranged to house the rotor 210 and the stator 220.

The tubular portion 231 of the casing 230 is arranged to have an inside diameter substantially equal to an outside diameter of the core 221. The core 221 is fixed to an inner circumferential surface of the tubular portion 231 through, for example, an adhesive. The stator 220 is thus fixed to an inner circumferential surface of the casing 230. The cover portion 232 includes a circular hole 233 defined in a center thereof in the r directions. The hole 233 is arranged to have a diameter greater than that of the first shaft 110, and the first shaft 110 is arranged to pass through the hole 233. A bearing 234 in the shape of a circular ring is fitted around the hole 233, and the bearing 234 is arranged to rotatably support the first shaft 110.

The casing 230 is arranged to have an external shape being a combination of a semicircle and a rectangle when viewed in the x direction. In other words, the casing 230 includes a semicircular portion 235 and a flange portion 236, which are semicircular and rectangular, respectively, when viewed in the x direction. A semicircular exterior of the semicircular portion 235 is arranged to be concentric with an inner circumferential surface of the semicircular portion 235. That is, the exterior of the semicircular portion 235 is an arc-shaped surface which is semicircular with the central axis of the first shaft 110 as a center. Meanwhile, the flange portion 236 includes two right-angled corner portions 237 each of which projects in an r direction, and the flange portion 236 is joined to the speed reducer 300 through bolts at the corner portions 237.

The cover 240 is a circular plate having a diameter slightly greater than that of a circular opening of the casing 230. The cover 240 is fixed at the opening of the casing 230 to close the opening. The cover 240 includes a circular hole 241 defined in a center thereof in the r directions. A bearing 242 in the shape of a circular ring is fitted in the hole 241. The bearing 242 is arranged to rotatably support the first shaft 110.

Once electric currents are supplied to the coils 222 of the stator 220, which is the armature, in the motor 200 having the above-described structure, action of electromagnetic induction causes the first shaft 110 to rotate in the θ direction.

1-3. Structure of Speed Reducer

The structure of the speed reducer 300 will now be described below with reference to FIG. 2. The speed reducer 300 is a strain wave gearing device arranged to transfer rotation from the first shaft 110 to a second shaft 120, which is a rotating shaft arranged to extend in the x direction, while changing the speed of the rotation. The speed reducer 300 includes a housing 301, an internal gear 302, an external gear 303, and a wave generator 310.

The first shaft 110 is arranged to extend in the x direction from the cover 240, and the wave generator 310 is connected to one end of the first shaft 110. The wave generator 310 includes a cam 304 and a flexible bearing 305.

Figure 3:
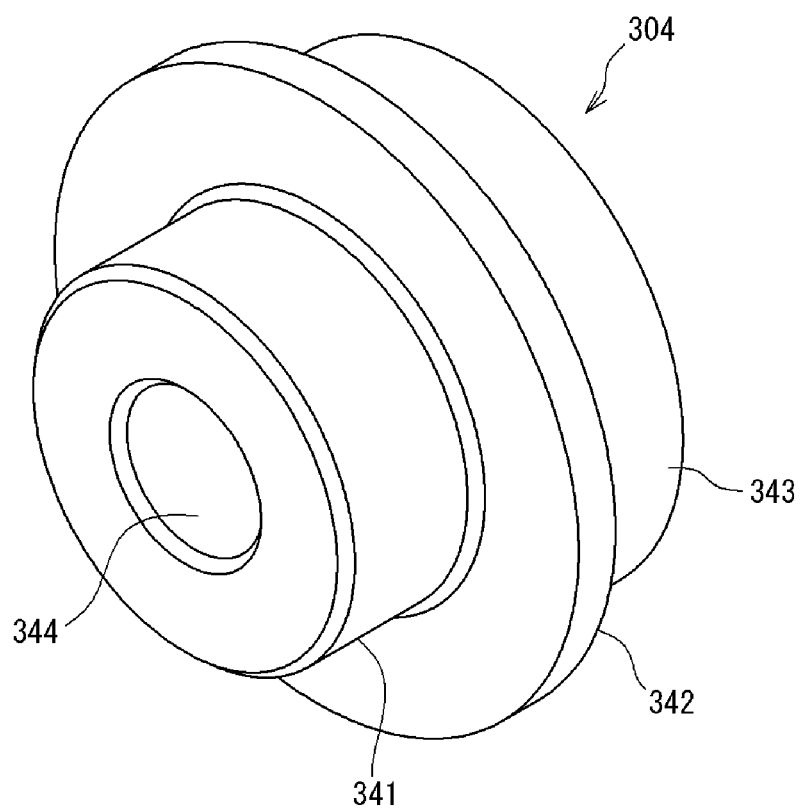
FIG. 3 is a perspective view illustrating an example exterior of a cam according to the first preferred embodiment of the present invention.

The cam 304 is fixed to one end portion of the first shaft 110. FIG. 3 is a perspective view illustrating an exterior of the cam 304. The cam 304 includes a small diameter portion 341 and a large diameter portion 342 arranged in the x direction. Each of the small diameter portion 341 and the large diameter portion 342 is arranged to have a circular exterior centered on the central axis 111 of the first shaft 110, and the large diameter portion 342 is arranged to have an outside diameter greater than that of the small diameter portion 341. The large diameter portion 342 is arranged closer to the motor 200 than is the small diameter portion

341. An outer circumferential portion of the large diameter portion 342 includes an elliptical decreased diameter portion 343, and the flexible bearing 305 is fitted to the decreased diameter portion 343 (see FIG. 2).

The cam 304 includes a connection hole 344 defined in a center thereof in the r directions. The one end portion of the first shaft 110 is housed in the connection hole 344, and the one end portion of the first shaft 110 is fixed in the connection hole 344 (see FIG. 2). This allows the cam 304 to rotate in the θ direction together with the first shaft 110.

Figure 4:
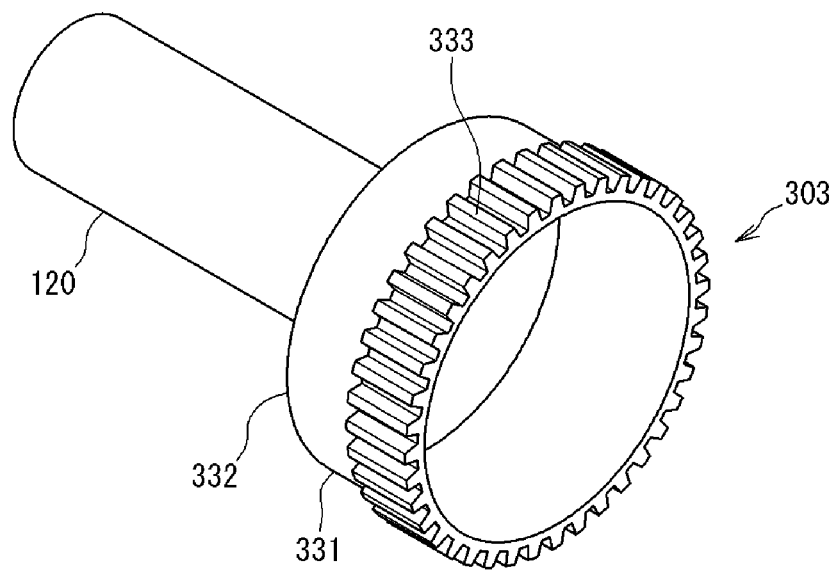
FIG. 4 is a perspective view illustrating an example exterior of an external gear according to the first preferred embodiment of the present invention.

FIG. 4 is a perspective view illustrating an exterior of the external gear 303. The external gear 303 is a cup-shaped external gear which is closed at one end and open at another end in the x direction. That is, the external gear 303 includes a cylindrical portion 331 and a disk-shaped cover portion 332, and the cover portion 332 is arranged to close one end of the cylindrical portion 331. The cylindrical portion 331 is a thin cylinder made of a metal, such as, for example, carbon steel, and is flexible. The cylindrical portion 331 includes an external tooth portion 333 at another end thereof, more specifically, at an outer circumference of an end portion thereof closer to the motor 200.

The cover portion 332 includes surfaces on both sides in the x direction, and the second shaft 120 is arranged to extend in the x direction from a center in the r directions of one of the surfaces of the cover portion 332 on an opposite side to the surface thereof on which the cylindrical portion 331 is arranged. The external gear 303 is arranged to be coaxial with the first shaft 110, and the second shaft 120 and the first shaft 110 are arranged coaxially in series (see FIG. 2). The second shaft 120 is fixed to the cover portion 332, and is arranged to rotate in the θ direction together with the cover portion 332.

Reference will now be made to FIG. 2. The cam 304 is housed in the cylindrical portion 331 of the external gear 303. The flexible bearing 305 is arranged between an inner circumferential surface of the cylindrical portion 331 of the external gear 303 and the decreased diameter portion 343 (i.e., an outer circumferential surface) of the cam 304. This allows the external gear 303 and the cam 304 to rotate in the θ direction relative to each other. The flexible bearing 305 includes a flexible outer race member 351, a flexible inner race member 352, and a plurality of balls 353 housed between the outer race member 351 and the inner race member 352, and is capable of being deformed in the r directions.

The cam 304 is a metal block made of, for example, carbon steel, and is arranged to have a high rigidity. Thus, the flexible bearing 305, which is attached to the cam 304, is fitted to an outer circumferential surface of the decreased diameter portion 343 of the cam 304, and is deformed into an elliptical shape. In addition, since an inner circumferential surface of the external gear 303 is in contact with the flexible bearing 305, the cylindrical portion 331 of the external gear 303 is deformed into an elliptical shape matching an exterior of the flexible bearing 305.

Similarly to the casing 230 of the motor 200, the housing 301 is arranged to have a shape being a combination of a semicircle and a rectangle when viewed in the x direction (see FIG. 1). In other words, the housing 301 includes a semicircular portion 311 and a flange portion 312, which are semicircular and rectangular, respectively, when viewed in the x direction. The semicircular portion 311 is arranged to have a diameter equal to that of the semicircular portion 235 of the casing 230, and the flange portion 312 includes two right-angled corner portions 313 each of which projects in an r direction. The shape of the flange portion 312 of the housing 301 and the shape of the flange portion 236 of the casing 230 match each other, and the flange portion 312 and the flange portion 236 are fixed to each other through the bolts.

Figure 5:
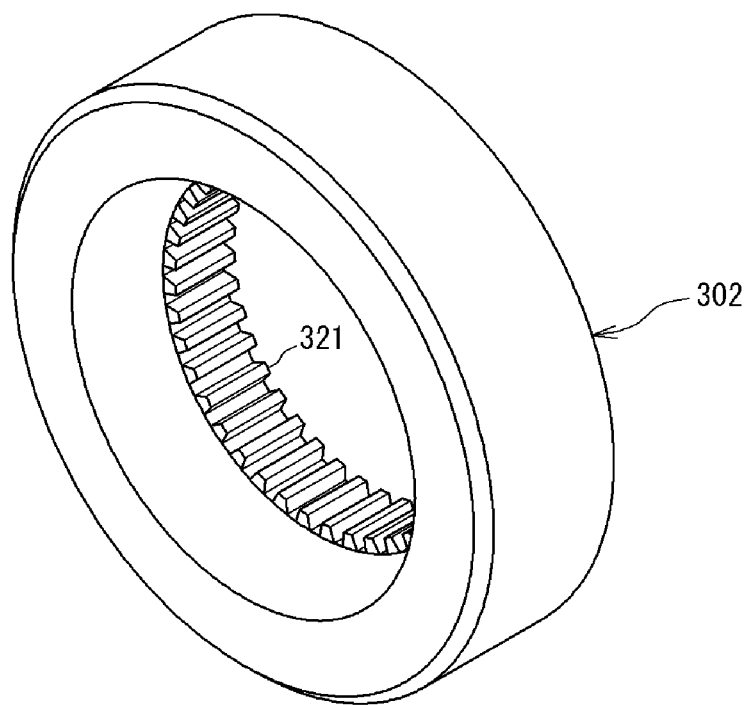
FIG. 5 is a perspective view illustrating an example exterior of an internal gear according to the first preferred embodiment of the present invention.

In addition, referring to FIG. 2, the housing 301 has an interior space having a circular section, and the internal gear 302 is housed in this interior space. FIG. 5 is a perspective view illustrating an example exterior of the internal gear 302. The internal gear 302 is in the shape of a circular ring, and is press fitted into the interior space of the housing 301. The housing 301 and the internal gear 302 are fixed to each other. The internal gear 302 includes an internal tooth portion 321 defined in an inner circumference thereof.

Reference will now be made to FIG. 2. The external gear 303 is arranged inside of the internal gear 302. As mentioned above, the external gear 303 is deformed into a shape being elliptical when viewed in the x direction. Accordingly, teeth of the external tooth portion 333 of the external gear 303 which correspond to a major axis mesh with the internal tooth portion 321 of the internal gear 302, while teeth of the external tooth portion 333 which correspond to a minor axis are apart from the internal tooth portion 321.

The number of teeth of the internal tooth portion 321 of the internal gear 302 is different from the number of teeth of the external tooth portion 333 of the external gear 303. For example, when n denotes a positive integer, the number of teeth of the internal tooth portion 321 is arranged to be greater than the number of teeth of the external tooth portion 333 by 2$n$. Once the first shaft 110 starts rotating, the cam 304 starts rotating together with the first shaft 110. The rotation of the cam 304 causes the external gear 303 to be elastically deformed such that the major axis of the elliptical shape rotates. Accordingly, meshing positions between the external tooth portion 333 and the internal tooth portion 321 move in the θ direction. That is, the wave generator 310 causes the external gear 303 to be deformed in accordance with the rotation of the first shaft 110 such that meshing positions between the internal gear 302 and the external gear 303 shift in the θ direction. Every time the first shaft 110 completes a single rotation, the external gear 303 rotates in the θ direction by an amount corresponding to a difference between the number of teeth of the internal tooth portion 321 and the number of teeth of the external tooth portion 333. As a result, the rotation of the first shaft 110 is transferred to the second shaft 120 while the speed of the rotation is reduced.

A bearing 306 is attached to the housing 301, and the bearing 306 is arranged to support the second shaft 120 such that the second shaft 120 is capable of rotating about the central axis 111. In addition, a washer 307 and a disk-shaped plate member 308 are attached to the second shaft 120 such that the bearing 306, the washer 307, and the plate member 308 are arranged in the x direction.

1-4. Assembly of Housing and Internal Gear

Figure 6:
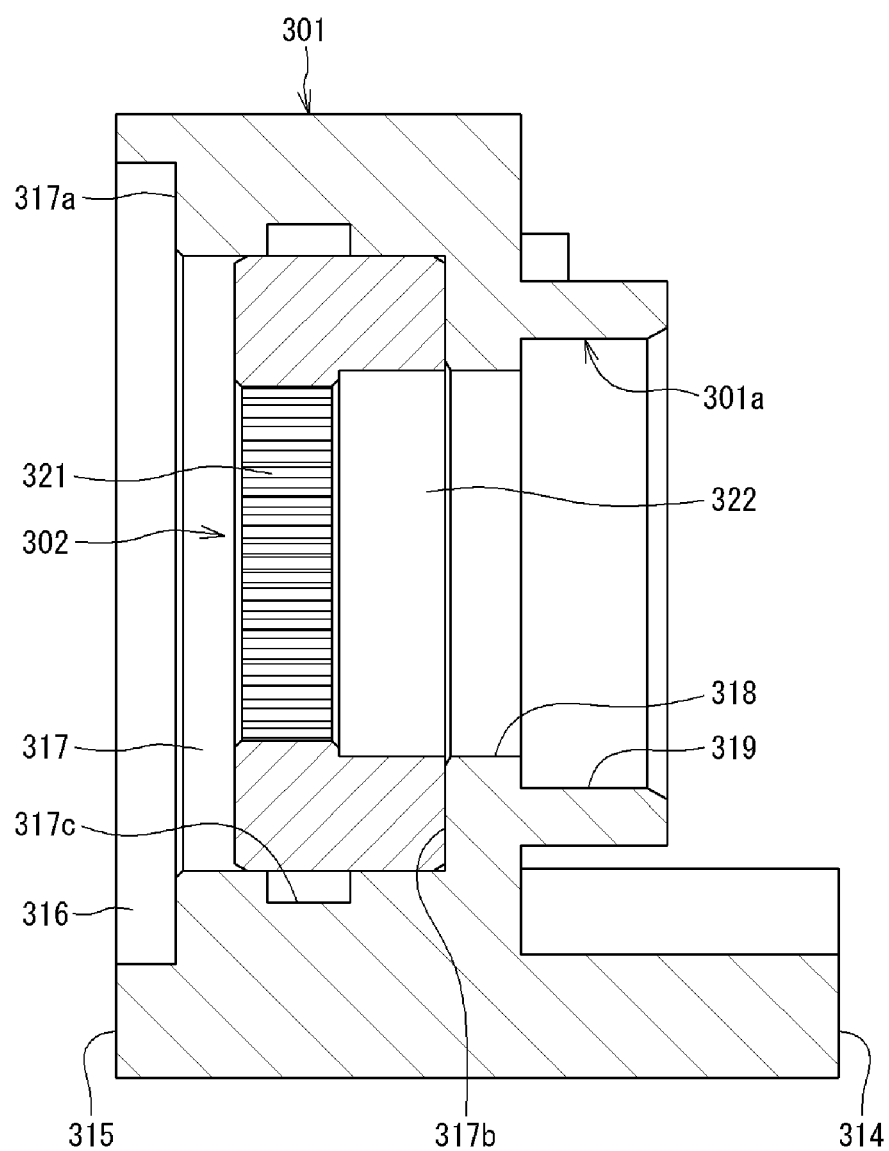
FIG. 6 is a side sectional view illustrating an assembly of a housing and the internal gear of a speed reducer according to the first preferred embodiment of the present invention.

FIG. 6 is a side sectional view illustrating an assembly of the housing 301 and the internal gear 302 of the speed reducer 300 according to the present preferred embodiment.

The second shaft 120 is arranged to extend in the x direction over a range including an output-side end 314, which is one end of the housing 301 in the x direction. The first shaft 110 is arranged to extend in the x direction over a range including an input-side end 315, which is another end of the housing 301 in the x direction (see FIG. 2).

The housing 301 is made of a metal material, an engineering plastic, or the like which has a high workability. Referring to FIG. 6, the housing 301 has a cavity including a plurality of concentric spaces continuous with one another. In other words, the housing 301 includes an inner circumferential surface 301a arranged to define the above cavity, and the inner circumferential surface 301a includes inner circumferential surfaces 316, 317, 318, and 319 each of which is circular and is centered on the central axis 111.

The inner circumferential surfaces 316, 317, 318, and 319 are arranged in the order named from the input-side end 315 toward the output-side end 314 of the housing 301. The inner circumferential surface 317 is arranged to have a diameter smaller than that of the inner circumferential surface 316. In addition, the inner circumferential surface 318 is arranged to have a diameter smaller than that of the inner circumferential surface 317, and the inner circumferential surface 319 is arranged to have a diameter greater than that of the inner circumferential surface 318.

The cover 240 is housed in the space inside of the inner circumferential surface 316. The internal gear 302 is housed in the space inside of the inner circumferential surface 317. That is, the inner circumferential surface 317 is a joining surface joined to the internal gear 302. In addition, a portion of the external gear 303 is housed in the space inside of the inner circumferential surface 318, while a portion of the bearing 306 and a portion of the second shaft 120, which is supported by the bearing 306, are housed in the space inside of the inner circumferential surface 319.

As described above, the inner circumferential surface 317, which is the joining surface joined to the internal gear 302, is arranged between the inner circumferential surface 316, which has a larger diameter, and the inner circumferential surface 318, which has a smaller diameter. Accordingly, a shoulder is defined between the inner circumferential surfaces 316 and 317, defining an end surface 317a. In addition, a shoulder is also defined between the inner circumferential surfaces 317 and 318, defining an end surface 317b.

A recessed portion 317c recessed in the r directions is defined in the inner circumferential surface 317. The recessed portion 317c is arranged in the shape of a circular ring, extending 360 degrees in the θ direction along the inner circumferential surface 317.

An example of the recessed portion 317c is illustrated in FIG. 6. This example recessed portion 317c is arranged between the end surfaces 317a and 317b. More specifically, the recessed portion 317c is defined in an intermediate portion of the inner circumferential surface 317 in the x direction.

The diameter of the inner circumferential surface 317 is slightly smaller than an outside diameter of the internal gear 302. The internal gear 302 is press fitted into the inner circumferential surface 317 having the above dimension, and the housing 301 and the internal gear 302 are joined to each other. At this time, the internal gear 302 is press fitted into the inner circumferential surface 317 until one end surface of the internal gear 302 facing in the x direction comes into contact with the end surface 317b. The dimension of the internal gear 302 measured in the x direction is smaller than the dimension of the inner circumferential surface 317 measured in the x direction, and is greater than the dimension of the recessed portion 317c measured in the x direction. In addition, the recessed portion 317c is arranged at an outer circumferential surface of the internal gear 302 after the press fitting. That is, the recessed portion 317c is arranged between both end surfaces of the internal gear 302 in the x direction.

The internal gear 302 is a member in the shape of a circular ring, and is made of, for example, a metal material having a high wear resistance. The internal tooth portion 321 is defined in an end portion (i.e., an input-side end portion) of an inner circumferential portion of the internal gear 302 as described above on a side closer to the motor 200. In addition, the internal gear 302 further includes, in the inner circumferential portion thereof, an untoothed region 322 where no teeth to mesh with the external tooth portion 333 of the external gear 303 are provided. The untoothed region 322 is a circular smooth surface. The untoothed region 322 as described above is arranged in an end portion (i.e., an output-side end portion) of the inner circumferential surface of the internal gear 302 on a side away from the motor 200.

The external gear 303 is arranged in an interior space of the internal gear 302, and the second shaft 120 is connected to an output-side end (i.e., the cover portion 332) of the external gear 303 in the x direction (see FIG. 4). The end of the external gear 303 to which the second shaft 120 is connected is arranged on an opposite side of the internal tooth portion 321 in the x direction with respect to the motor 200. The aforementioned untoothed region 322 is arranged closer to the output-side end of the external gear 303 than is the internal tooth portion 321. In addition, no untoothed region is arranged on an opposite side of the internal tooth portion 321 in the x direction with respect to the untoothed region 322, that is, on a side of the internal tooth portion 321 closer to the motor 200.

The provision of the untoothed region 322 as described above leads to an increase in the dimension of the internal gear 302 measured in the x direction. This in turn results in an increase in area over which the internal gear 302 is press fitted to the housing 301, resulting in an increase in strength with which the internal gear 302 is fitted to the housing 301. In addition, it is necessary to provide the cover portion 332 at the output-side end of the external gear 303 for connection with the second shaft 120. Accordingly, the untoothed region 322 is arranged on the side on which the second shaft 120 is connected to the external gear 303, and the untoothed region 322 can thus be arranged in a space secured for provision of the cover portion 332, resulting in increased efficiency in space usage. Thus, a significant increase in the area over which the internal gear 302 is press fitted to the housing 301, and a reduced size of the internal gear 302, can be achieved at the same time.

Note that the above-described structure of the internal gear 302 is an example structure, and that the internal gear 302 may alternatively be arranged to have another structure. For example, the internal tooth portion 321 may alternatively be arranged to extend over the entire inner circumferential surface of the internal gear 302, with the untoothed region 322 being eliminated. Also, untoothed regions may alternatively be arranged on both sides of the internal tooth portion 321 in the inner circumferential surface of the internal gear 302. Also, the untoothed region may alternatively be arranged on the side of the internal tooth portion 321 closer to the motor 200 in the inner circumferential surface of the internal gear 302.

The recessed portion 317c is arranged opposite to the internal tooth portion 321 of the internal gear 302 in the r directions. More specifically, in the preferred embodiment illustrated in FIG. 6, the recessed portion 317c is arranged opposite to a portion of the internal tooth portion 321 in the r directions. That is, the internal tooth portion 321 is arranged on straight lines extending in the r directions from the position of the recessed portion 317c. In other words, a range over which the recessed portion 317c extends in the x direction overlaps with a range over which the internal tooth portion 321 extends in the x direction.

When the internal gear 302 is press fitted into the space inside of the inner circumferential surface 317, the shape of the inner circumferential surface 317 of the housing 301 can be transferred to the internal gear 302 to deform the internal tooth portion 321 of the internal gear 302. However, in the range over which the recessed portion 317c extends in the x direction, the housing 301 and the internal gear 302 are not in contact with each other, and the shape of the inner surface of the housing 301 is not transferred to the internal gear 302. Therefore, in the range over which the recessed portion 317c extends in the x direction, the likelihood of a deformation of the internal tooth portion 321 is reduced. This contributes to preventing a deterioration in accuracy with which the internal gear 302 and the external gear 303 mesh with each other.

The depth of the recessed portion 317c, that is, the dimension of the recessed portion 317c measured in the r directions, is equal to or smaller than a half of a maximum thickness, measured in the r directions, of a portion of the housing 301 which corresponds to the inner circumferential surface 317. This contributes to ensuring a sufficient mechanical strength of the housing 301 while avoiding an excessive reduction in the thickness of the housing 301 measured in the r directions.

1-5. Example Modifications

Speed reducers according to example modifications of the first preferred embodiment will now be described below.

1-5-1. First Modification

Figure 7:
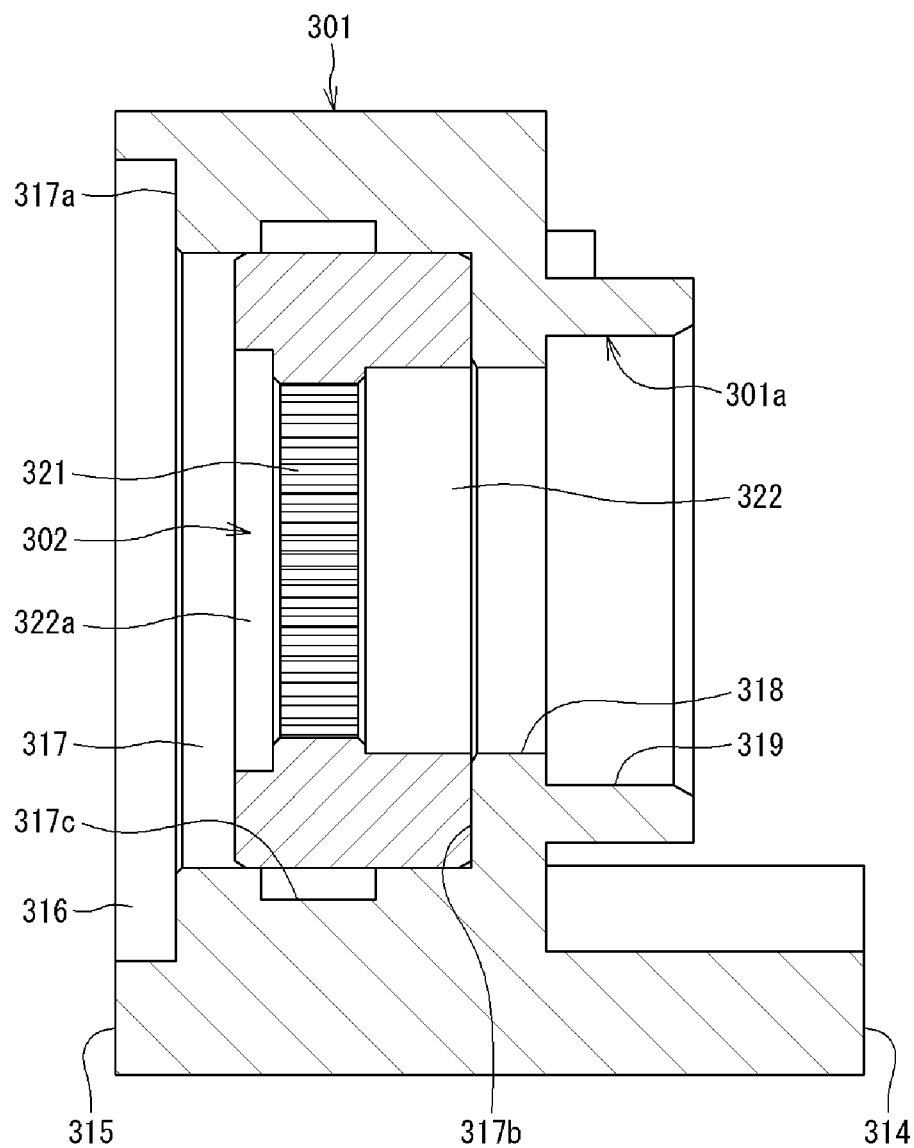
FIG. 7 is a side sectional view illustrating an assembly of a housing and an internal gear of a speed reducer according to a first modification of the first preferred embodiment of the present invention.

FIG. 7 is a side sectional view illustrating an assembly of a housing 301 and an internal gear 302 of a speed reducer according to a first modification of the first preferred embodiment. In this modification, an untoothed region 322a is additionally arranged on a side of an internal tooth portion 321 closer to a motor 200 in an inner circumferential surface of the internal gear 302. That is, the internal tooth portion 321 is spaced apart in the x direction from an end surface of the internal gear 302 on a side closer to the motor 200. In addition, in an inner circumferential surface 317 of the housing 301, a recessed portion 317c is arranged between an end surface 317a and an end surface 317b. More specifically, the recessed portion 317c is defined in an intermediate portion of the inner circumferential surface 317 in the x direction. A portion of the recessed portion 317c as described above is arranged opposite to the entire internal tooth portion 321 in the r directions. In other words, a range over which the internal tooth portion 321 extends in the x direction is included in a range over which the recessed portion 317c extends in the x direction. That is, as illustrated in FIG. 7, the entire range over which the internal tooth portion 321 extends in the x direction overlaps with the range over which the recessed portion 317c extends in the x direction.

This contributes to preventing the entire internal tooth portion 321 from being deformed by the inner circumferential surface 317 of the housing 301. This in turn contributes to more effectively preventing a deterioration in meshing between the internal gear 302 and an external gear 303.

1-5-2. Second Modification

Figure 8:
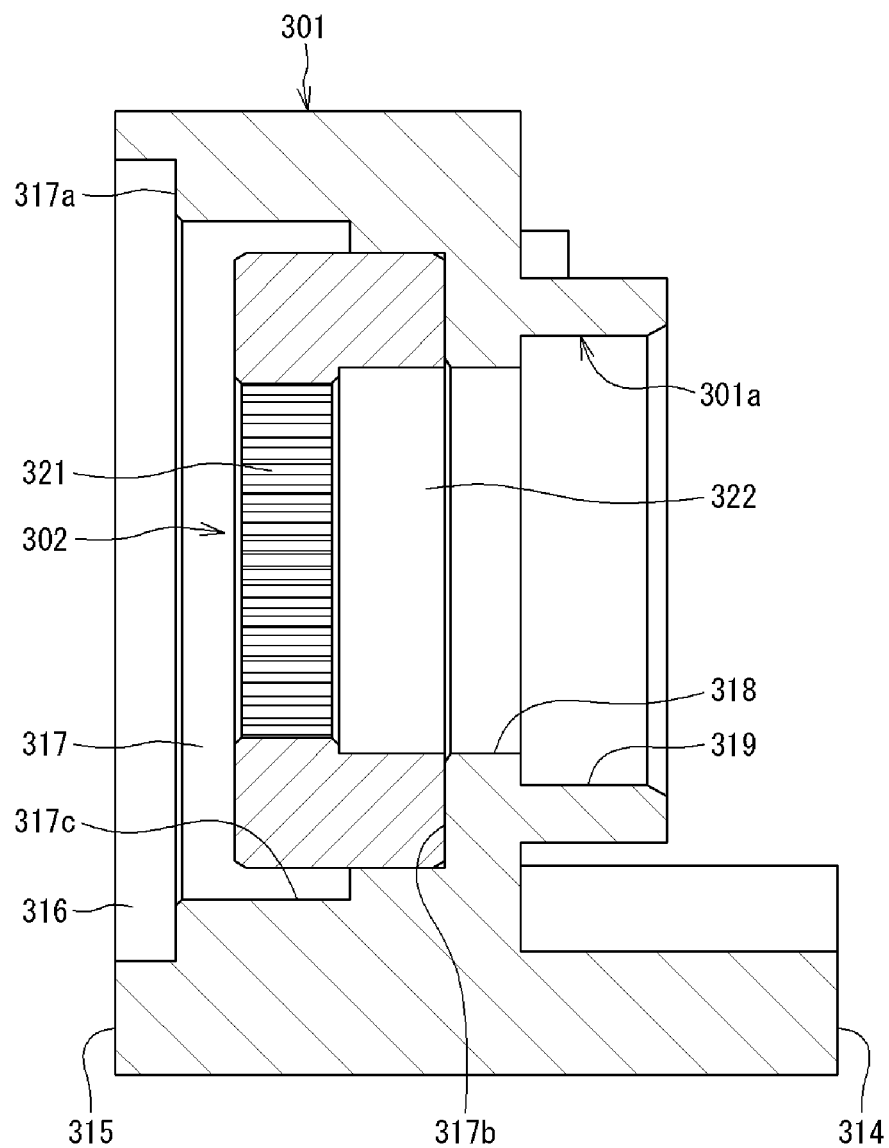
FIG. 8 is a side sectional view illustrating an assembly of a housing and an internal gear of a speed reducer according to a second modification of the first preferred embodiment of the present invention.

FIG. 8 is a side sectional view illustrating an assembly of a housing 301 and an internal gear 302 of a speed reducer according to a second modification of the first preferred embodiment. In this modification, an internal tooth portion 321 is defined in an end portion of the internal gear 302 on a side closer to a motor 200. In addition, a recessed portion 317c is arranged to extend over a range from an intermediate point on an inner circumferential surface 317 in the x direction to an end surface 317a. That is, the recessed portion 317c is arranged to open in the end surface 317a of the housing 301. In other words, the recessed portion 317c is arranged to open toward a side of the housing 301 closer to the motor 200.

Since the recessed portion 317c opens toward the side of the housing 301 closer to the motor 200, the housing 301 and internal gear 302 are not in contact with each other on a side of the recessed portion 317c closer to the motor 200 in the x direction. In addition, the internal tooth portion 321 is arranged on the side closer to the motor 200 in an inner circumferential surface of the internal gear 302. This contributes to more effectively preventing the shape of an inner surface of the housing 301 from affecting the shape of the internal tooth portion 321. In addition, joining of the internal gear 302 to the housing 301 is made easier because a space to house the internal gear 302 is widely open toward the side of the housing 301 closer to the motor 200.

1-5-3. Third Modification

Figure 9:
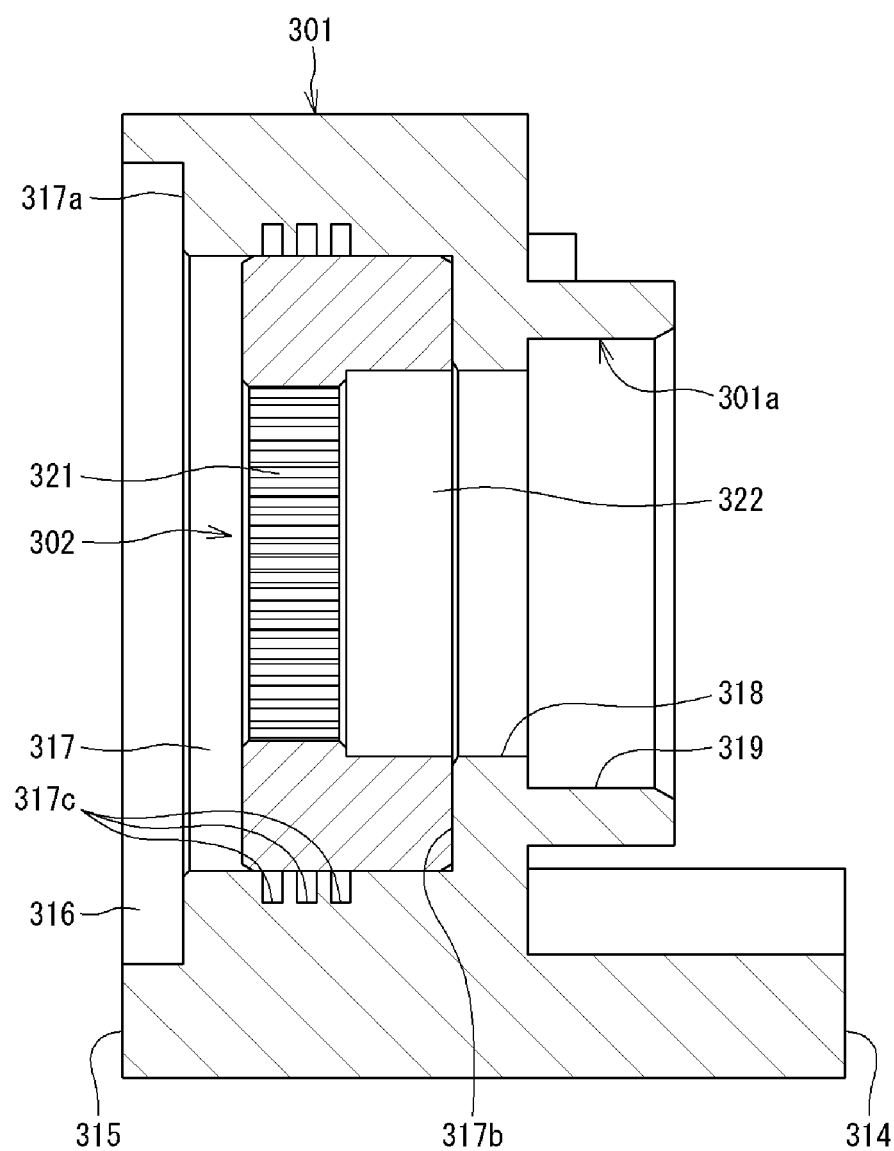
FIG. 9 is a side sectional view illustrating an assembly of a housing and an internal gear of a speed reducer according to a third modification of the first preferred embodiment of the present invention.

FIG. 9 is a side sectional view illustrating an assembly of a housing 301 and an internal gear 302 of a speed reducer according to a third modification of the first preferred embodiment. In this modification, a plurality of recessed portions 317c, which are arranged in the x direction, are defined in an inner circumferential surface 317 of the housing 301. Each recessed portion 317c is arranged opposite to an internal tooth portion 321 in the r directions.

This contributes to preventing a deformation of the internal tooth portion 321. In addition, the total area of contact between the inner circumferential surface 317 and the internal gear 302 is reduced to make it easier to join the internal gear 302 to the housing 301.

2. Second Preferred Embodiment

Figure 10:
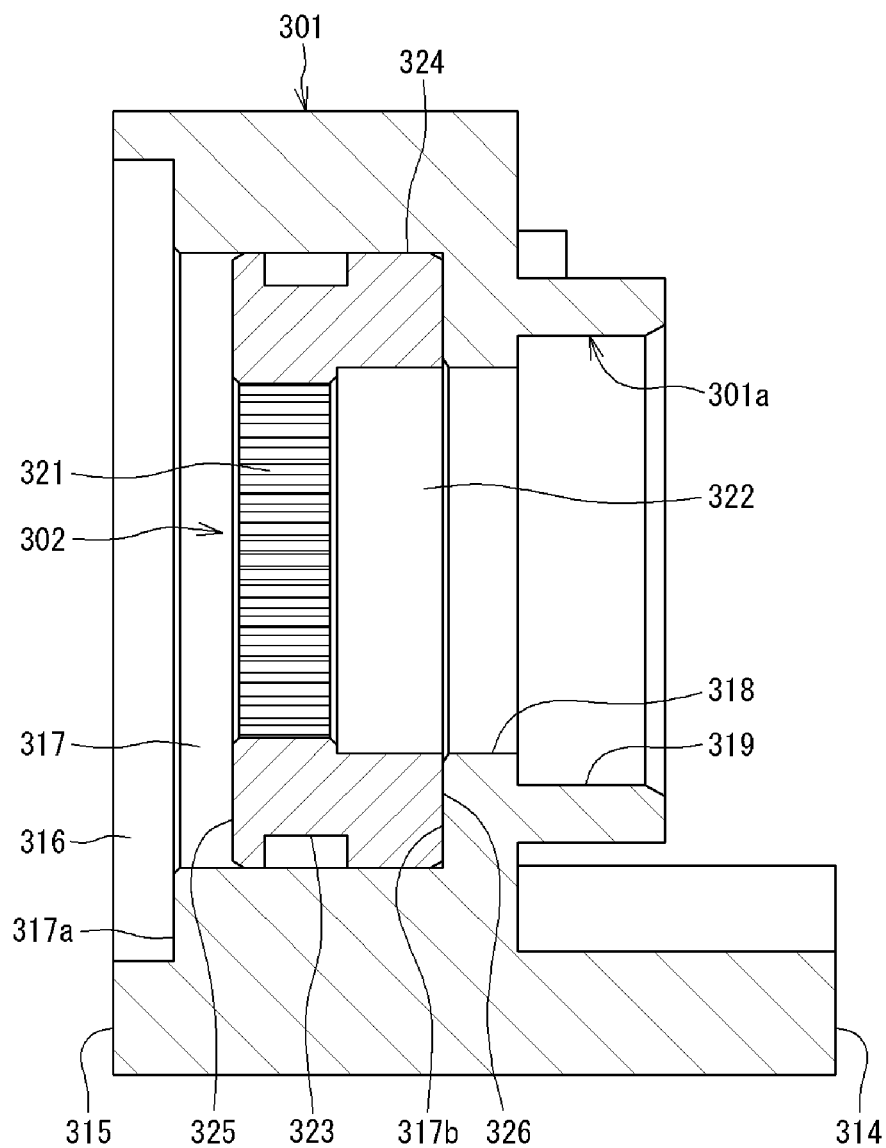
FIG. 10 is a side sectional view illustrating an assembly of a housing and an internal gear of a speed reducer according to a second preferred embodiment of the present invention.

FIG. 10 is a side sectional view illustrating an assembly of a housing 301 and an internal gear 302 of a speed reducer according to a second preferred embodiment of the present invention. The speed reducer according to the second preferred embodiment does not include a recessed portion 317c in an inner circumferential surface 317 of the housing 301, but instead includes a recessed portion 323 in an outer circumferential surface 324 of the internal gear 302. The speed reducer according to the second preferred embodiment is otherwise similar in structure to the speed reducer according to the first preferred embodiment. Accordingly, like members or portions are designated by like reference numerals, and redundant description is omitted.

The internal gear 302 includes the outer circumferential surface 324, an end surface 325 on a side closer to a motor 200 (i.e., an input side), and an end surface 326 on a side away from the motor 200 (i.e., an output side). The recessed portion 323, which is recessed in the r directions, is defined in the outer circumferential surface 324. The recessed portion 323 is arranged in the shape of a circular ring, extending 360 degrees in the θ direction along the outer circumferential surface 324.

An example of the recessed portion 323 is illustrated in FIG. 10. This example recessed portion 323 is arranged between the end surfaces 325 and 326. More specifically, the recessed portion 323 is defined in an intermediate portion of the outer circumferential surface 324 in the x direction.

An internal tooth portion 321 is defined in an end portion (i.e., an input-side end portion) of an inner circumferential portion of the internal gear 302 on the side closer to the motor 200. In addition, the internal gear 302 further includes, in the inner circumferential portion thereof, an untoothed region 322 where no teeth to mesh with an external tooth portion 333 of an external gear 303 are provided. The untoothed region 322 is a circular smooth surface. The untoothed region 322 as described above is arranged in an end portion (i.e., an output-side end portion) of the inner circumferential surface of the internal gear 302 on the side away from the motor 200. In addition, no untoothed region is arranged on an opposite side of the internal tooth portion 321 in the x direction with respect to the untoothed region 322, that is, on a side of the internal tooth portion 321 closer to the motor 200.

Note that the above-described structure of the internal gear 302 is an example structure, and that the internal gear 302 may alternatively be arranged to have another structure. For example, the internal tooth portion 321 may alternatively be arranged to extend over the entire inner circumferential surface of the internal gear 302, with the untoothed region 322 being eliminated. Also, untoothed regions may alternatively be arranged on both sides, in the x direction, of the internal tooth portion 321 in the inner circumferential surface of the internal gear 302. Also, the untoothed region may alternatively be arranged on the side of the internal tooth portion 321 closer to the motor 200 in the inner circumferential surface of the internal gear 302.

The recessed portion 323 is arranged opposite to the internal tooth portion 321 in the r directions. More specifically, in the preferred embodiment illustrated in FIG. 10, the recessed portion 323 is arranged opposite to a portion of the internal tooth portion 321 in the r directions. That is, the internal tooth portion 321 is arranged on straight lines extending in the r directions from the position of the recessed portion 323. In other words, a range over which the recessed portion 323 extends in the x direction overlaps with a range over which the internal tooth portion 321 extends in the x direction.

When the internal gear 302 is press fitted into a space inside of the inner circumferential surface 317, the shape of the inner circumferential surface 317 of the housing 301 can be transferred to the internal gear 302 to deform the internal tooth portion 321 of the internal gear 302. However, in the range over which the recessed portion 323 extends in the x direction, the housing 301 and the internal gear 302 are not in contact with each other, and the shape of the inner surface of the housing 301 is not transferred to the internal gear 302. Therefore, in the range over which the recessed portion 323 extends in the x direction, the likelihood of a deformation of the internal tooth portion 321 is reduced. This contributes to preventing a deterioration in accuracy with which the internal gear 302 and the external gear 303 mesh with each other.

The depth of the recessed portion 323, that is, the dimension of the recessed portion 323 measured in the r directions, is equal to or smaller than a half of a maximum thickness, measured in the r directions, of a portion of the internal gear 302 which corresponds to the outer circumferential surface 324. This contributes to ensuring a sufficient mechanical strength of the internal gear 302 while avoiding an excessive reduction in the thickness of the internal gear 302 measured in the r directions.

2-1. Example Modifications

Speed reducers according to example modifications of the second preferred embodiment will now be described below.

2-1-1. First Modification

Figure 11:
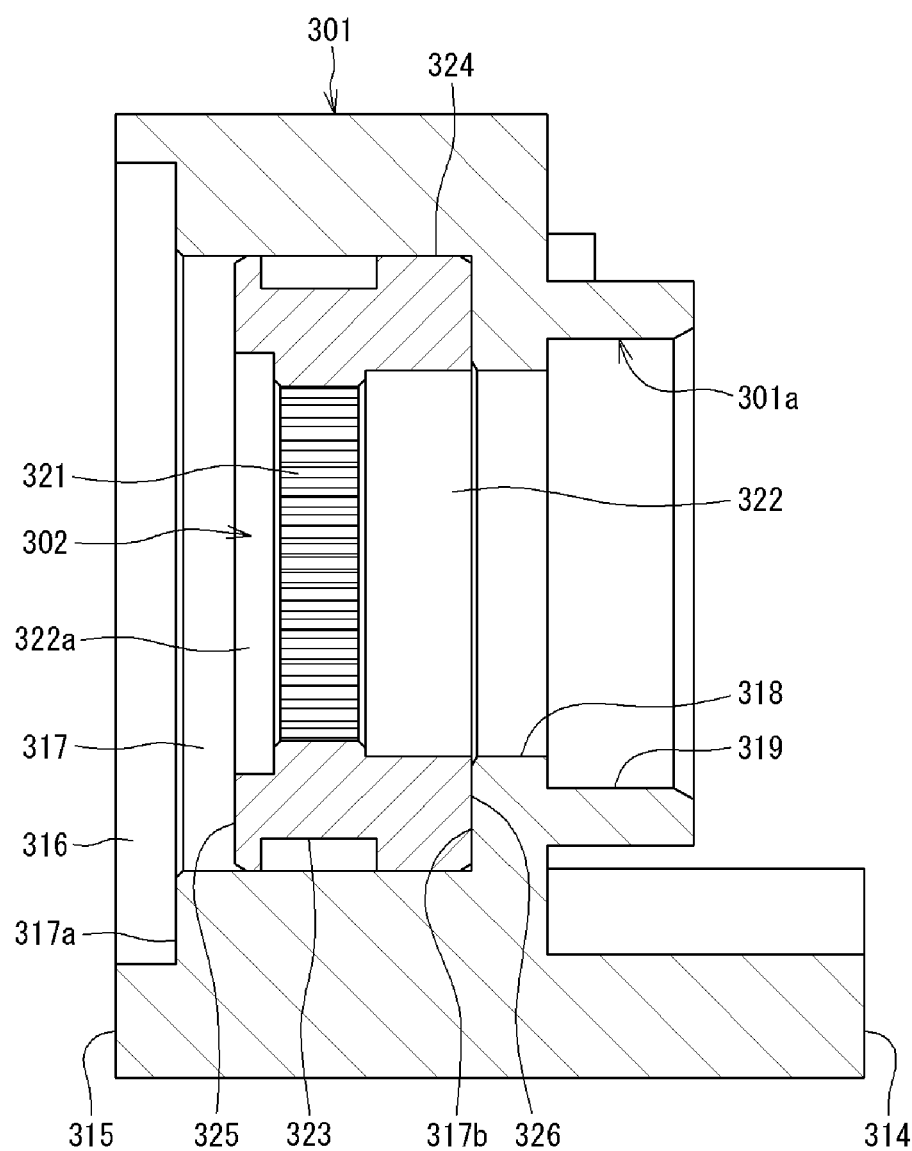
FIG. 11 is a side sectional view illustrating an assembly of a housing and an internal gear of a speed reducer according to a first modification of the second preferred embodiment of the present invention.

FIG. 11 is a side sectional view illustrating an assembly of a housing 301 and an internal gear 302 of a speed reducer according to a first modification of the second preferred embodiment. In this modification, an untoothed region 322a is additionally arranged on a side of an internal tooth portion 321 closer to a motor 200 in an inner circumferential surface of the internal gear 302. That is, the internal tooth portion 321 is spaced apart in the x direction from an end surface 325 of the internal gear 302 on a side closer to the motor 200. In addition, a recessed portion 323 is arranged between the end surface 325 and an end surface 326 in an outer circumferential surface 324 of the internal gear 302. More specifically, the recessed portion 323 is defined in an intermediate portion of the outer circumferential surface 324 in the x direction. A portion of the recessed portion 323 as described above is arranged opposite to the entire internal tooth portion 321 in the r directions. In other words, a range over which the internal tooth portion 321 extends in the x direction is included in a range over which the recessed portion 323 extends in the x direction. That is, as illustrated in FIG. 11, the entire range over which the internal tooth portion 321 extends in the x direction overlaps with the range over which the recessed portion 323 extends in the x direction.

This contributes to preventing the entire internal tooth portion 321 from being deformed by an inner circumferential surface 317 of the housing 301. This in turn contributes to more effectively preventing a deterioration in meshing between the internal gear 302 and an external gear 303.

2-1-2. Second Modification

Figure 12:
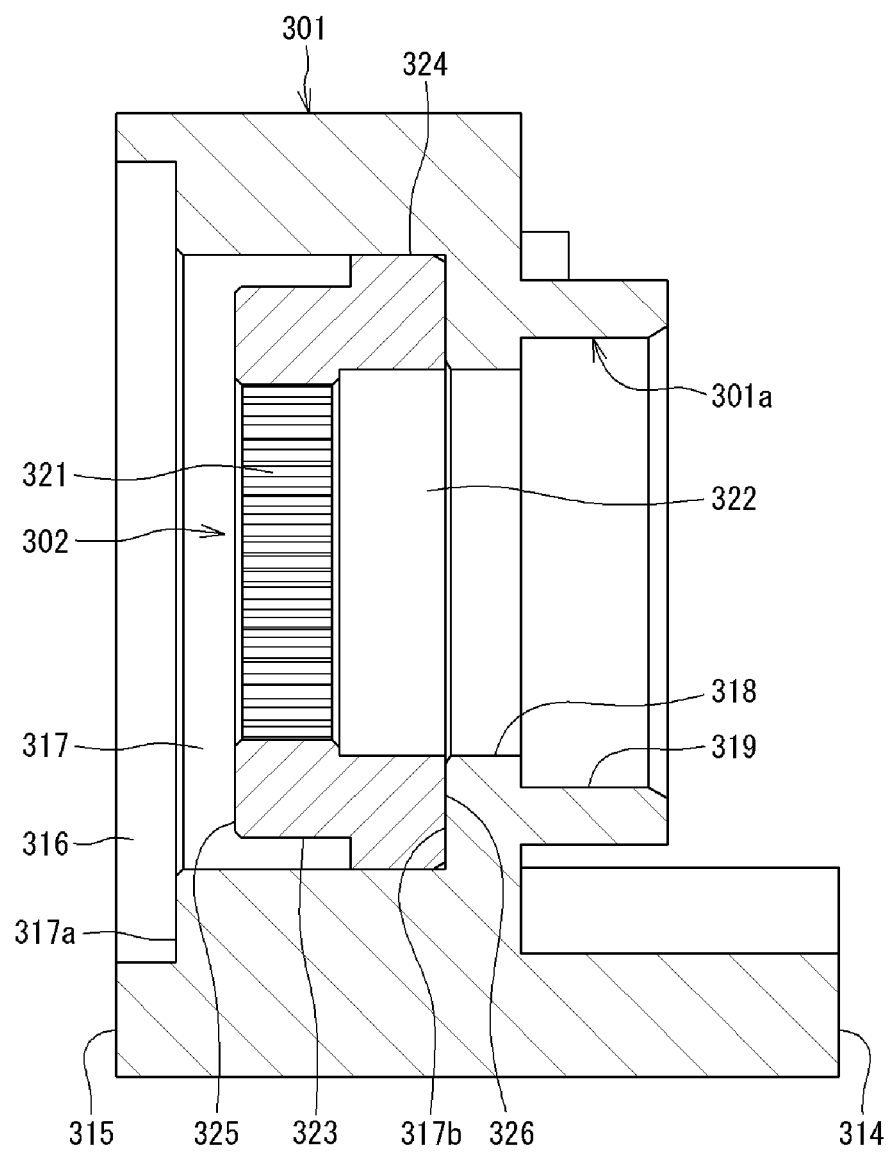
FIG. 12 is a side sectional view illustrating an assembly of a housing and an internal gear of a speed reducer according to a second modification of the second preferred embodiment of the present invention.

FIG. 12 is a side sectional view illustrating an assembly of a housing 301 and an internal gear 302 of a speed reducer according to a second modification of the second preferred embodiment. In this modification, an internal tooth portion 321 is defined in an end portion of the internal gear 302 on a side closer to a motor 200. In addition, a recessed portion 323 is arranged to extend over a range from an intermediate point on an outer circumferential surface 324 in the x direction to an end surface 325. That is, the recessed portion 323 is arranged to open in the end surface 325 of the internal gear 302. In other words, the recessed portion 323 is arranged to open toward a side of the internal gear 302 closer to the motor 200.

Since the recessed portion 323 opens toward the side of the internal gear 302 closer to the motor 200, the housing 301 and internal gear 302 are not in contact with each other on a side of the recessed portion 323 closer to the motor 200 in the x direction. In addition, the internal tooth portion 321 is arranged on the side closer to the motor 200 in an inner circumferential surface of the internal gear 302. This contributes to more effectively preventing the shape of an inner surface of the housing 301 from affecting the shape of the internal tooth portion 321.

2-1-3. Third Modification

Figure 13:
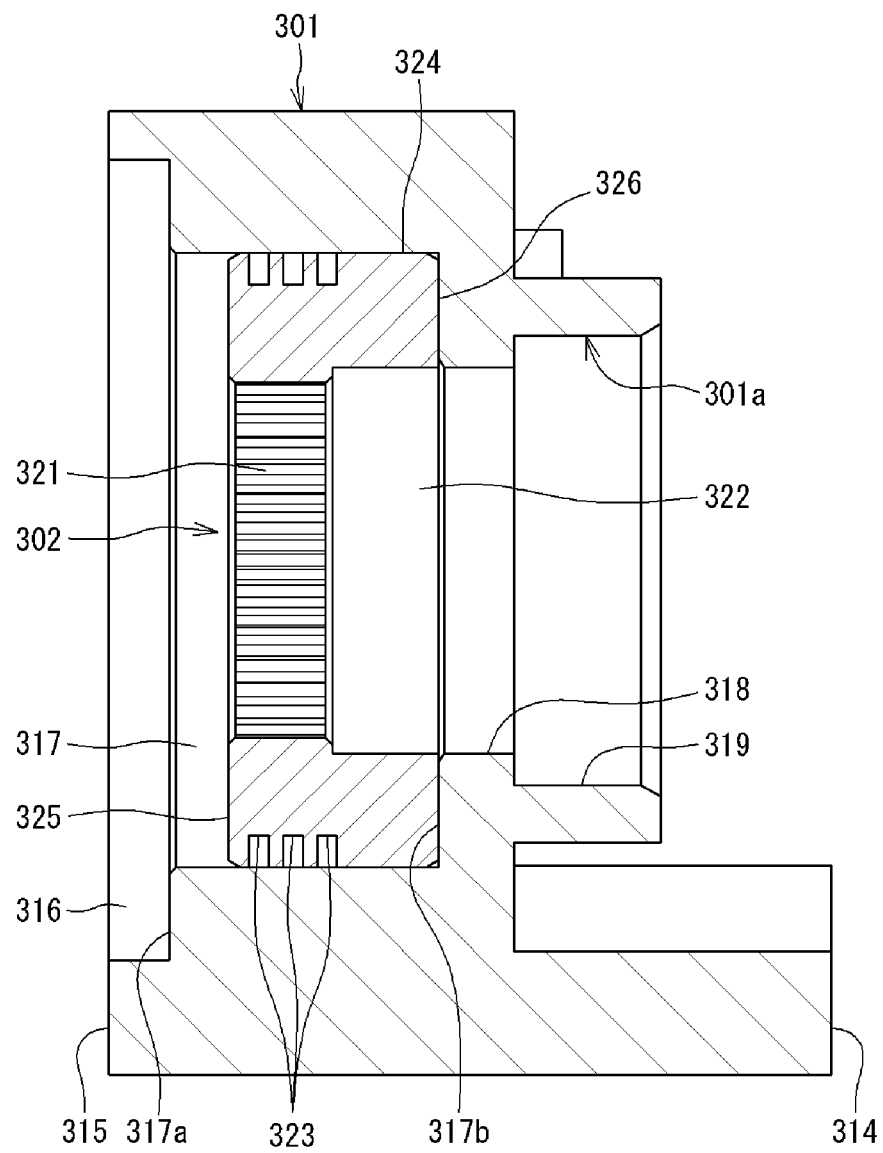
FIG. 13 is a side sectional view illustrating an assembly of a housing and an internal gear of a speed reducer according to a third modification of the second preferred embodiment of the present invention.

FIG. 13 is a side sectional view illustrating an assembly of a housing 301 and an internal gear 302 of a speed reducer according to a third modification of the second preferred embodiment. In this modification, a plurality of recessed portions 323, which are arranged in the x direction, are defined in an outer circumferential surface 324 of the internal gear 302. Each recessed portion 323 is arranged opposite to an internal tooth portion 321 in the r directions.

This contributes to preventing a deformation of the internal tooth portion 321. In addition, the total area of contact between the outer circumferential surface 324 and the housing 301 is reduced to make it easier to join the internal gear 302 to the housing 301.

3. Other Example Modifications

In the actuator 100 according to each of the above-described first and second preferred embodiments of the present invention, the first shaft 110 is connected to the motor 200, which is an example of a rotary electric machine. Note, however, that actuators according to other preferred embodiments of the present invention may have another structure. In another preferred embodiment of the present invention, an electric generator, which is another example of a rotary electric machine, may be connected to a first shaft 110. In yet another preferred embodiment of the present invention, a second shaft 120 may be connected to a rotary electric machine, such as, for example, a motor, an electric generator, or a motor generator.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission comprising:
a first shaft that is rotatable in a circumferential direction about a central axis extending in one direction;
a second shaft that is rotatable in the circumferential direction, and arranged in series with the first shaft in an axial direction in which the central axis extends;
a tubular housing;
an internal gear including an internal tooth portion, and held by an inner surface of the housing;
an annular external gear connected to the second shaft, and including an external tooth portion that partially meshes with the internal tooth portion; and
a wave generator connected to the first shaft to deform the external gear such that meshing positions between the internal tooth portion and the external tooth portion shift in the circumferential direction; wherein
the internal gear and the housing are defined by separate members;
the internal gear includes a joining surface joined to the housing, and the housing includes a joining surface joined to the internal gear;
at least one of the joining surfaces includes at least one recessed portion recessed in radial directions centered on the central axis;
at least a portion of the at least one recessed portion overlaps with the internal tooth portion when viewed in the radial directions;
the internal gear includes an untoothed region where no teeth to mesh with the external tooth portion are provided;
the external gear is connected to the second shaft at one end thereof in the axial direction;
the untoothed region is located only on a side of the internal tooth portion closer to the one end of the external gear; and
at least a portion of a radial outer surface of the internal gear in the untoothed region contacts the housing.

2. The transmission according to claim 1, wherein
the at least one recessed portion includes a recessed portion recessed in the radial directions in the joining surface of the housing joined to the internal gear; and
the recessed portion has a depth equal to or smaller than a half of a maximum thickness, measured in the radial directions, of a portion of the housing which corresponds to the joining surface of the housing joined to the internal gear.

3. The transmission according to claim 2, wherein the first recessed portion opens toward an opposite side of the housing with respect to one end of the housing in the axial direction.

4. The transmission according to claim 2, wherein the at least one recessed portion includes a plurality of the first recessed portions arranged in the axial direction.

5. The transmission according to claim 1, wherein
the at least one recessed portion includes a recessed portion recessed in the radial directions in the joining surface of the internal gear joined to the housing; and
the recessed portion has a depth equal to or smaller than a half of a maximum thickness, measured in the radial directions, of a portion of the internal gear which corresponds to the joining surface of the internal gear joined to the housing.

6. The transmission according to claim 5, wherein
the second shaft is located on a side of one end of the internal gear in the axial direction; and
the recessed portion opens toward an opposite side of the internal gear with respect to the one end in the axial direction.

7. The transmission according to claim 5, wherein the at least one recessed portion includes a plurality of recessed portions arranged in the axial direction.

8. An actuator comprising:
the transmission of claim 1; and
a rotary electric machine connected to one of the first shaft and the second shaft.

9. A transmission comprising:
a first shaft that is rotatable in a circumferential direction about a central axis extending in one direction;
a second shaft that is rotatable in the circumferential direction, and arranged in series with the first shaft in an axial direction in which the central axis extends;
a tubular housing;
an internal gear including an internal tooth portion, and held by an inner surface of the housing;
an annular external gear connected to the second shaft, and including an external tooth portion that partially meshes with the internal tooth portion; and
a wave generator connected to the first shaft to deform the external gear such that meshing positions between the internal tooth portion and the external tooth portion shift in the circumferential direction; wherein
the internal gear and the housing are defined by separate members;
the internal gear includes a joining surface joined to the housing, and the housing includes a joining surface joined to the internal gear;

at least one of the joining surfaces includes at least one recessed portion recessed in radial directions centered on the central axis;

at least a portion of the at least one recessed portion overlaps with the internal tooth portion when viewed in the radial directions;

the at least one recessed portion includes a recessed portion recessed in the radial directions in the joining surface of the housing joined to the internal gear; and the recessed portion has a depth equal to or smaller than a half of a maximum thickness, measured in the radial directions, of a portion of the housing which corresponds to the joining surface of the housing joined to the internal gear.

10. The transmission according to claim 9, wherein the internal gear includes an untoothed region where no teeth to mesh with the external tooth portion are provided;

the external gear is connected to the second shaft at one end thereof in the axial direction; and the untoothed region is arranged only on a side of the internal tooth portion closer to the one end of the external gear.

11. The transmission according to claim 9, wherein the recessed portion is arranged opposite to the entire internal tooth portion in the radial directions.

12. The transmission according to claim 9, wherein the recessed portion is arranged to open toward an opposite side of the housing with respect to one end of the housing in the axial direction.

13. The transmission according to claim 9, wherein the at least one recessed portion includes a plurality of the recessed portions arranged in the axial direction.

14. An actuator comprising:
the transmission of claim 9; and
a rotary electric machine connected to one of the first shaft and the second shaft.

15. A transmission comprising:
a first shaft that is rotatable in a circumferential direction about a central axis extending in one direction;
a second shaft that is rotatable in the circumferential direction, and arranged in series with the first shaft in an axial direction in which the central axis extends;
a tubular housing;
an internal gear including an internal tooth portion, and held by an inner surface of the housing;
an annular external gear connected to the second shaft, and including an external tooth portion that partially meshes with the internal tooth portion; and a wave generator connected to the first shaft to deform the external gear such that meshing positions between the internal tooth portion and the external tooth portion shift in the circumferential direction; wherein the internal gear and the housing are defined by separate members;

the internal gear includes a joining surface joined to the housing, and the housing includes a joining surface joined to the internal gear;

at least one of the joining surfaces includes at least one recessed portion recessed in radial directions centered on the central axis;

at least a portion of the at least one recessed portion overlaps with the internal tooth portion when viewed in the radial directions;

the at least one recessed portion includes a recessed portion recessed in the radial directions in the joining surface of the internal gear joined to the housing; and the recessed portion has a depth equal to or smaller than a half of a maximum thickness, measured in the radial directions, of a portion of the internal gear which corresponds to the joining surface of the internal gear joined to the housing.

16. The transmission according to claim 15, wherein the internal gear includes an untoothed region where no teeth to mesh with the external tooth portion are provided;

the external gear is connected to the second shaft at one end thereof in the axial direction; and the untoothed region is only on a side of the internal tooth portion closer to the one end of the external gear.

17. The transmission according to claim 15, wherein the recessed portion is opposite to the entire internal tooth portion in the radial directions.

18. The transmission according to claim 15, wherein the second shaft is on a side of one end of the internal gear in the axial direction; and the recessed portion opens toward an opposite side of the internal gear with respect to the one end in the axial direction.

19. The transmission according to claim 15, wherein the at least one recessed portion includes a plurality of recessed portions arranged in the axial direction.

20. An actuator comprising:
the transmission of claim 15; and
a rotary electric machine connected to one of the first shaft and the second shaft.

* * * * *